United States Patent Office 3,054,806
Patented Sept. 18, 1962

3,054,806
RECOVERY OF MALEIC ANHYDRIDE
Jack B. Feder, Dumont, N.J., assignor to Scientific Design Company, Inc., a corporation of Delaware
No Drawing. Filed July 21, 1960, Ser. No. 44,282
3 Claims. (Cl. 260—346.8)

This invention relates to a process for the manufacture of maleic anhydride, more particularly to the process of condensing a substantial part of the maleic anhydride in a gaseous oxidation reaction mixture and especially such a process wherein maximum condensation of maleic anhydride is achieved while maintaining normal, long-term operation of the condensing means by controlling the temperature of the cooled gas so that it is in the range of about the freezing point of maleic anhydride up to about 62° C. and likewise controlling the maleic acid content of any deposit formed at any heat exchange region so that it is not over 40 percent.

Maleic anhydride is a commercially important material and it may be prepared by the catalytic partial oxidation of benzene or the like hydrocarbon in the presence of a catalyst such as vanadia or the like which may be supported on a carrier. The hot gaseous reaction mixture may be cooled to partially condense some of the maleic anhydride, and the remainder may be absorbed in water to make maleic acid. The latter is converted to maleic anhydride by dehydration; e.g. by distillation in the presence of an azeotroping agent such as xylene or the like. In the partial condensation of the maleic anhydride, there can be a build up of solids in relatively inaccessible places such as at heat exchange zones in the condenser tubes, and this causes slowdown in operation (due to increase in pressure drop through the tubes), and also operating hazards due to plugging or the like. The art is confronted by the problem of providing maximum condensation of maleic anhydride and at the same time maintaining normal long-term operation of the condensing means or equipment.

The discoveries associated with the invention relating to solutions of the above problems and the objects achieved in accordance with the invention as described herein include the provision of:

A process of condensing maleic anhydride from hot gaseous oxidation reaction mixture which comprises cooling the mixture to a temperature in the range of about 51.5° up to about 62° C., whereby a substantial part of the maleic anhydride thereon is condensed, and separating the resulting liquid, the maleic acid content of any deposit formed at any heat exchange zone being not over 40 percent;

Such processes wherein the content of maleic anhydride in the reaction mixture is in the range of 0.4 to 1.1 percent;

Such processes wherein the reaction mixture is cooled to a temperature in the range of 51.5 to 54.5° C.; and Other objects which will be apparent as details or embodiments of the invention are set forth hereinafter;

In order to indicate still more fully the nature of the present invention, the following examples of typical procedures are set forth, in which parts and percent mean part and percent by weight, respectively, it being understood that these examples are presented as illustrative only and are not intended to limit the scope of the invention.

EXAMPLE 1

A benzene air mixture containing 1.21 mol percent of benzene is fed downward through a tubular reactor at a volume space velocity of 2500/hr. (volume of feed gas per volume of catalyst per hour), at a reaction temperature of 365° C. (using a modified vanadia catalyst as described in the Robert B. Egbert & Mitchell Becker Patent 2,777,860, issued January 15, 1957).

The reactor tube may be of 7/8 inch internal diameter and the catalyst bed height may be 10 ft. The tube may be surrounded by a temperature regulating medium such as molten salt, molten metal or a copper jacket.

The gaseous reaction mixture is passed through a partial condenser containing one or more vertical tubes of about one inch internal diameter and about 8 feet in length. The tubes are surrounded by a temperature regulating medium, e.g. circulating water. About two thirds of the maleic anhydride content of the gas is condensed and drains out as a liquid. The remainder of the gas is passed to a water scrubbing column or tower wherein it is contacted countercurrently with water or aqueous maleic acid, so as to provide an up to about 40 percent by weight aqueous maleic acid solution.

The temperature in the condenser is controlled by the temperature regulating medium so that the exit gas temperature is in the range of 51.5° to 54.5° C. This operation is continued for 22.6 hours, and there is no increase in pressure drop across or through the condenser. Some deposit is formed in the tube, but not enough to affect the pressure drop, and the maleic acid content of this deposit is not over 40 percent.

In other words maximum recovery of maleic anhydride is achieved at these low temperatures without any interference with continuity of the operation.

*Comparative Example A*

The above procedure is repeated except that the temperature of the cooling medium is lowered so that the exit gas temperature is 50.5° C., and the pressure drop rises gradually until complete plugging which occurred at 1.75 hours of operation time.

In this comparative example, there is relatively less recovery of the maleic anhydride and also normal operation is interfered with, especially by the complete stoppage at 1.75 hours.

The condenser is brought up to a temperature of about 58° C. (so that maleic anhydride melts and drains out), and operation is resumed with the conditions such that the exit gas temperature is 52° C. The pressure drop across the condenser rises rapidly so that there is substantial plugging in about 1.25 hours of operation under these conditions.

Once the maleic anhydride mixture has been allowed to freeze, subsequent heating does not remove the resulting stoppage completely, as evident from the foregoing data. The increase in pressure drop through the condenser eventually necessitates removal of the condenser from service in order to restore its performance (by leaching or scraping out the solids). A typical analysis of such solids built up in this manner is:

| | Percent |
|---|---|
| Maleic acid | 59.2 |
| Maleic anhydride | 11.4 |
| Malic acid | 0.1 |
| Fumaric acid | 0.1 |
| Ash | 2.1 |
| Tar (remainder). | |

On the other hand, the deposit from an Example 1 operation contains not over 40 percent maleic acid, desirably less than 30 percent and preferably less than 10 percent; the ash in this type operation is quite high (about 17 percent) as is the tar (about 26 percent).

The liquid maleic anhydride condensate produced during the normal condenser operation contains maleic acid in an amount in the range of about 2 to 7 percent.

It is evident from the foregoing data that once the maleic anhydride mixture in the condensation system has been allowed to freeze, the normal performance cannot be restored merely by melting out maleic anhydride. There is not sufficient maleic anhydride present to redissolve precipitated maleic acid, even if the conditions are maintained so that the subsequently condensed maleic anhydride mixture is above the freezing point of maleic anhydride. The solubility of maleic acid in maleic anhydride is not over about 0.2% at the condensing temperatures useful for substantial recovery of maleic anhydride from the reactor effluent gas, so that the maleic anhydride condensate is generally supersaturated with maleic acid.

The precipitated maleic acid apparently acts as a nucleus for relatively rapid deposition of additional maleic acid.

Comparable results to the foregoing are obtained with various modifications thereof including the following. The temperature to which the gaseous reaction mixture is cooled is in the range of about 51.5° up to about 62° C., desirably below about 58° C. and preferably 51.5° to 54.5° C. The maleic anhydride content in the gaseous reaction mixture may be in the range of 0.4 to 1.1, desirably 0.6 to 1.0, and preferably 0.8 to 0.98.

It is indeed surprising that the manufacture of maleic anhydride may be carried out in efficient manner in accordance with the invention with minimum down-time and minimum interference with the manufacturing operation by necessary cleaning or removal of solid deposits.

In view of the foregoing disclosures, variations and modifications thereof will be apparent to one skilled in the art and it is intended to include within the invention all such variations and modifications except as do not come within the scope of the appended claims.

What is claimed is:

1. In a process for recovering liquid maleic anhydride from a hot gaseous oxidation reaction mixture wherein the gaseous mixture is cooled by indirect heat exchange in a cooling zone and a liquid condensate consisting essentially of a supersaturated solution of maleic acid in maleic anhydride is formed, the improvement which comprises maintaining the said cooling zone substantially free of solid deposited material having a maleic acid content in excess of 40% and continuously maintaining the temperature to which the gaseous mixture is cooled in the range of about 51.5° C. to 62° C.

2. A process of claim 1 wherein the content of maleic anhydride in the reaction mixture is in the range of 0.4 to 1.1 percent.

3. A process of claim 2 wherein the reaction mixture is cooled to a temperature in the range of 51.5 to 54.5° C.

References Cited in the file of this patent

UNITED STATES PATENTS

| 2,215,070 | Miller | Sept. 17, 1940 |
| 2,302,888 | Porter | Nov. 24, 1942 |

FOREIGN PATENTS

| 789,414 | Great Britain | Jan. 22, 1958 |

OTHER REFERENCES

Kirk-Othmer: Encyclopedia of Chemical Technology, vol. 8, (Interscience, 1952), pages 690–1.